(12) United States Patent
Westman et al.

(10) Patent No.: US 8,381,680 B2
(45) Date of Patent: Feb. 26, 2013

(54) METHOD AND ARRANGEMENT IN MILKING SYSTEM

(75) Inventors: Anders Westman, Rönninge (SE); Anders Thylén, Tumba (SE)

(73) Assignee: DeLaval Holding AB, Tumba (SE)

( * ) Notice: Subject to any disclaimer, the term of this patent is extended or adjusted under 35 U.S.C. 154(b) by 471 days.

(21) Appl. No.: 12/602,602

(22) PCT Filed: May 27, 2008

(86) PCT No.: PCT/SE2008/050623
§ 371 (c)(1),
(2), (4) Date: May 27, 2010

(87) PCT Pub. No.: WO2008/147321
PCT Pub. Date: Dec. 4, 2008

(65) Prior Publication Data
US 2010/0252119 A1    Oct. 7, 2010

(30) Foreign Application Priority Data
Jun. 1, 2007 (SE) ...................................... 0701331

(51) Int. Cl.
*A01J 7/02* (2006.01)
(52) U.S. Cl. .............. 119/14.18; 119/14.02; 119/14.08
(58) Field of Classification Search ............... 119/14.01, 119/14.02, 14.08, 14.18, 650, 651
See application file for complete search history.

(56) References Cited

U.S. PATENT DOCUMENTS

| | | | |
|---|---|---|---|
| 2,680,445 A | | 6/1954 | Hemminger |
| 2,859,759 A | | 11/1958 | Hurwitz |
| 2,878,819 A | | 3/1959 | Thomas |
| 3,116,743 A | * | 1/1964 | Sparr ......................... 134/102.1 |
| 4,061,504 A | * | 12/1977 | Zall et al. ..................... 134/95.1 |
| 4,168,677 A | * | 9/1979 | Brown ........................ 119/14.18 |
| 4,175,514 A | * | 11/1979 | Souza et al. ............... 119/14.08 |
| 4,222,346 A | * | 9/1980 | Reisgies .................... 119/14.18 |

(Continued)

FOREIGN PATENT DOCUMENTS

| | | |
|---|---|---|
| GB | 2339877 A | 2/2000 |
| JP | 2000324970 | 11/2000 |
| JP | 2004321119 A | 11/2004 |
| RU | 2093982 C1 | 10/1997 |
| RU | 2244417 C2 | 1/2005 |
| WO | 2005058023 | 6/2005 |
| WO | 2005102035 | 11/2005 |
| WO | 2006032731 | 3/2006 |

OTHER PUBLICATIONS

International Search Report dated Aug. 26, 2008, from corresponding PCT application.

(Continued)

*Primary Examiner* — David Parsley
(74) *Attorney, Agent, or Firm* — Young & Thompson

(57) ABSTRACT

A method and arrangement for monitoring the supply of cleaning liquid from a cleaning line to a milking system, where the milking system includes at least two milking stations and milk conduits, and the cleaning line includes supply conduits connectable to the milk conduits at the milking stations and arranged to apportion cleaning liquid to the milking stations, so that cleaning liquid flows through the milking stations. The method includes measuring a value of the flow of the cleaning liquid through the respective milking stations by a respective flow sensor and transferring the values of the measured flows to a control unit. The arrangement includes a first control unit and flow sensors and a respective flow sensor is adapted to measure a value of the flows of cleaning liquid through a respective milking station, and provide the values to the control unit.

20 Claims, 3 Drawing Sheets

U.S. PATENT DOCUMENTS

| | | | | |
|---|---|---|---|---|
| 4,452,268 A | * | 6/1984 | Icking et al. | 137/240 |
| 4,516,530 A | * | 5/1985 | Reisgies et al. | 119/14.08 |
| 4,572,105 A | * | 2/1986 | Chowdhury et al. | 119/14.18 |
| 5,167,201 A | * | 12/1992 | Peles | 119/14.18 |
| 5,245,946 A | | 9/1993 | Hoefelmayr et al. | |
| 5,405,452 A | * | 4/1995 | Anderson et al. | 134/22.12 |
| 5,881,669 A | * | 3/1999 | van den Berg et al. | 119/14.03 |
| 5,896,828 A | | 4/1999 | Kronschnabel et al. | |
| 6,089,242 A | * | 7/2000 | Buck | 134/57 R |
| 6,267,077 B1 | * | 7/2001 | van den Berg et al. | 119/14.01 |
| 6,852,172 B1 | * | 2/2005 | Lidman | 134/21 |
| 2005/0268944 A1 | | 12/2005 | Bexten et al. | |

OTHER PUBLICATIONS

Translation of Russian Office Action dated May 31, 2012, from corresponding RU application.

European Search Report, dated Sep. 21, 2011, in EP 08779306.

\* cited by examiner

METHOD AND ARRANGEMENT IN MILKING SYSTEM

FIELD OF INVENTION

The present invention relates generally to the cleaning of milking systems and especially to the supply of cleaning liquid to a milking system.

BACKGROUND

Modern milking systems comprise milking stations able to milk animals, such as cows, and transfer the milk to a storage tank, while waiting for transport to a dairy plant. The milk is a vulnerable food product with high demands for cleanliness and handling temperatures, and it is important to protect it from micro organisms and prevent chemical reactions. Thus, the equipment of such a milking system has to be cleaned regularly. A way to clean the equipment is to empty the system from milk and supply a cleaning liquid, by means of a cleaning liquid supply line, to the milking system.

In milking systems which comprises several milking stations there is a need to make sure that a sufficient amount of cleaning liquid is supplied to the equipment of each station. The Japanese patent document JP 2000-324970 illustrates such a system. To supply a sufficient amount of cleaning liquid to the teat cups of the milking stations, selector valves are provided to alternately supply cleaning liquid to the teat cups at a first and a second milk line, respectively. In this way cleaning liquid is not supplied to all milking stations at the same time and thus a larger amount of cleaning liquid can be supplied to each station.

It is desirable to be able to clean as many stations as possible at the same time, but it is difficult to determine how many that can be sufficiently cleaned at the same time, especially in large milking systems, so called large milking parlors, with many stations.

The above-described drawbacks and deficiencies of the prior art are overcome or alleviated by a method and an arrangement for monitoring the supply of cleaning liquid to a milking system.

SUMMARY OF THE INVENTION

According to the invention there is provided a method and an arrangement of monitoring the supply of cleaning liquid from a cleaning line to a milking system, where the milking system comprises at least two milking stations and milk conduits, and the cleaning line comprises supply conduits connectable to the milk conduits at the milking stations and arranged to apportion cleaning liquid to the milking stations, so that cleaning liquid flows through the milking stations.

The method includes measuring a value of the flow of the cleaning liquid through the respective milking stations by means of a respective flow sensor, and transferring said values to a control unit.

The arrangement comprises a first control unit and flow sensors and a respective flow sensor is adapted to measure a value of the flows of cleaning liquid through a respective milking station, and provide said values to the first control unit.

Thus, the supply is monitored and a sufficient amount can be provided. Also, an unnecessarily large consumption of cleaning liquid can be avoided. It will be appreciated that the invention is of particular value in milking installations having a large number of milking stations. A typical large milking parlor comprises from 20 to 40 milking stations in a row, and often installations are configured in double rows. The invention is applicable for even larger installations.

In one embodiment the first control unit comprises a display and is adapted to display the values, and the method includes displaying the values at the control unit, so that the operator can monitor changes in performance.

One embodiment of the method includes alarming when the value of a measured flow is below a predefined minimum value to avoid inadequate cleaning.

Preferably the arrangement comprises means for regulating the supply of cleaning liquid to the milking system as a response to the measured flow and the method includes the step of regulating the supply of cleaning liquid to the milking system as a response to the values of the measured flows.

The supply regulation can include temporarily closing the supply to some milking stations, so that the supply to other milking stations increases. The arrangement can comprise electronic shut-off valves for this purpose.

Another example of the supply regulation is to regulate so that the difference between the values of the flows through the at least two milking stations decrease. Thus the supply is balanced between the milking stations.

The flow regulation can include decreasing the flow through a milking station when the measured flow exceeds a predefined maximum value, avoiding unnecessary large consumption of cleaning liquid.

In a preferred embodiment of the arrangement, the flow sensors are constituted by milk meters arranged at the milking stations. The method in this embodiment includes measuring the flow with the milk meters at the milking stations, thus using the milk meters in the system also during the cleaning process.

In further embodiments the regulating means comprises flow limiting inserts, preferably adapted for insertion into the supply conduits of the cleaning line and/or valves, preferably arranged on the supply conduits of the cleaning system. Preferably, the valves are electronic valves, i.e. electronically controllable valves, and are, in the embodiment that includes milk meters, preferably arranged in the milk meters.

In a further embodiment the first control unit is adapted to control the electronic valves.

In a further embodiment the arrangement comprise a cleaning unit connected to the cleaning line, and preferably the first control unit is arranged in the cleaning unit.

Alternatively to arranging the first control unit in the cleaning unit, the first control unit is in one embodiment adapted to control a milking process and, preferably, also adapted to control the electronic valves. This embodiment can, alternatively, include a second control unit and the first control unit can be adapted to transfer the values to the second control unit, which second control unit is adapted to control the electronic valves. This embodiment can include a cleaning unit and the second control unit can be arranged in the cleaning unit.

Further preferred embodiments are defined by the dependent claims.

BRIEF DESCRIPTION OF DRAWINGS

The invention is now described, by way of example, with reference to the accompanying drawings, in which.

DETAILED DESCRIPTION OF PREFERRED EMBODIMENTS

In the following a detailed description of preferred embodiments of the present invention will be given.

Figure 1:
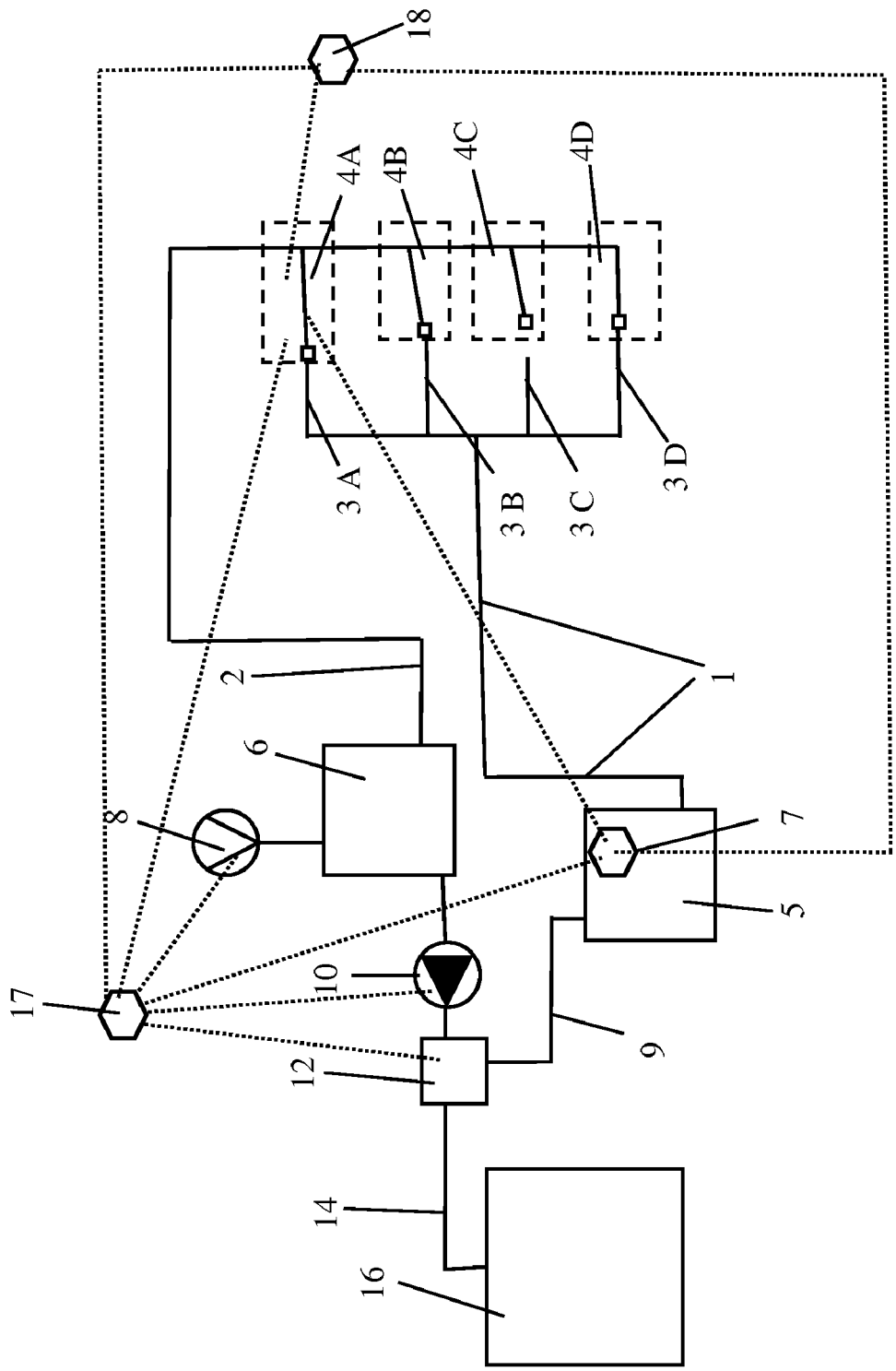
FIG. 1 illustrates an arrangement according to an embodiment of the invention implemented in a milking system provided with cleaning equipment.

FIG. 1 illustrates schematically the main parts of a milking system provided with cleaning equipment. The milking system comprises milking stations 4A,B,C,D, where animals are milked. Milk is drawn through a milk line 2 to a milk container 6 by means of a vacuum produced by a vacuum source 8. From the milk container 6, the milk is pumped to a milk cooling tank 16, by means of a milk pump 10, via a milk conduit 14. Milk meters 20 A,B,C,D and 22 (in FIGS. 2 and 3) are arranged at the milking stations 4A-D for measuring the milk flow from the milking stations 4A-D to the milk conduit, and these milk meters are communicatively connected to a control unit 17 and/or 18, which monitors the flows and amounts of milk at the milking stations 4A-D. A valve arrangement 12 is located between the milk pump 10 and the milk cooling tank 16 and is arranged to selectively connect the milk pump 10 to the milk cooling tank 16 or to a cleaning unit 5, via a conduit 9.

The cleaning unit 5 is part of the cleaning equipment, which comprises a cleaning line 1 for supplying cleaning liquid to the milking system, via branch conduits 3A-D connectable to respective milking stations 4A-D. The cleaning unit also comprises internal elements (not illustrated), such as water supply valves, a dosing pump for adding solvent to the cleaning liquid, a heating element for heating the cleaning liquid, so that cleaning can be performed in common ways such as using water, heated water and water with a solvent as cleaning liquid. The cleaning equipment is arranged so that, during cleaning, the cleaning liquid is supplied via the cleaning line 1 and apportioned by means of the branch conduits 3A-D to the milking stations 4A-D. Each branch conduit is connectable to a respective milking station 4A-D, so that, during milking, the branch conduits 3A-D are disconnected and, during cleaning, the branch conduits 3A-D are connected to the respective milking station 4A-D. The vacuum source is then used to draw the cleaning liquid through the milking system from the milking stations 4A-D to the milk container 6. From the milk container 6 it is pumped by the milk pump 10 via valve arrangement 12 back to the cleaning unit 5. The cleaning liquid is then circulated through the system. The cleaning unit 5 is also connected to an outlet (not shown) for discharging used cleaning liquid.

As an alternative to the valve arrangement 12, a hose connected to the milk pump 10 can be used, which hose can be moved between the milk cooling tank 16 and the cleaning unit 5, so as to selectively connect the milk pump 10 to the cleaning unit 5 and the milk cooling tank 16, respectively.

FIG. 1 also illustrates examples on control units 7, 17, 18 for controlling the milking process, the cleaning process, and especially the monitoring of cleaning liquid.

Thus, in one embodiment, a milking control unit 18 controls the milking process and a cleaning control unit 7, arranged in the cleaning unit 5, controls the cleaning process. To control the arrangement and the monitoring of cleaning liquid the milk control unit 18 and the cleaning control unit 7 can be communicatively interconnected. The monitoring of the supply of cleaning liquid is performed by the milk meters 20A-D, 22 in FIGS. 2 and 3, measuring the flow through each milking station 4A-D and the result is transferred to the milking control unit 18. The result of the measurements can then be used for regulating the supply of cleaning liquid. Suitable constructional features for monitoring and controlling the supply of cleaning liquid to the milking system will be further discussed when describing FIGS. 2 and 3 below.

In FIG. 1 is, however, also illustrated an alternative to using a milking control unit 18 for controlling milking and a cleaning control unit 7 for controlling the cleaning. A central control unit 17 is arranged to control the supply of vacuum, control the milk pump and monitor the milking stations. Communication connections are illustrated by dotted lines in FIG. 1, where the central control unit 17 receives information from the milking stations 4 directly or via the milking control unit 18 and/or the cleaning control unit 7.

A somewhat simplified alternative for the milking process can be provided by using the control unit to monitor the milk flow, but not for controlling the milk pump 10. The milk pump 10 can be controlled equipping the milk container 6 with level detectors and arranging the milk pump to be turned on and off depending on the level of milk in the milk container 6 as detected by the detectors.

For the cleaning process there is, preferably, a transfer of information between the milking system and the cleaning equipment, facilitating both monitoring and control of the supply of cleaning liquid. On way to achieve this is to use the illustrated central control unit 17 communicatively connected directly to both the milking system and the cleaning equipment. Another way is to use the illustrated milking control unit 18 to monitor the flow and transfer the information to the cleaning control unit 7.

The monitoring is accomplished by measuring the flow of cleaning liquid supplied at the milking stations. This can be done by arranging flow sensors 26A-D in the branching conduits 3 or using the milk meters 4 at the milking stations. Thus, instead of inactivating the milk meters and/or the milking control unit during cleaning, the flow of cleaning liquid through the milk meters is measured and the result is transferred to a control unit 7, 17, 18, chosen so as to be suitable for use together with the chosen regulating means.

Regulation can be accomplished in many ways, one example is indicating, using an alarm function, when the supply is to low, and as a response to the alarm increase the flow. This increase can be accomplished by decreasing the flow in some conduits so as to increase it where the flow is too low.

Figure 2:
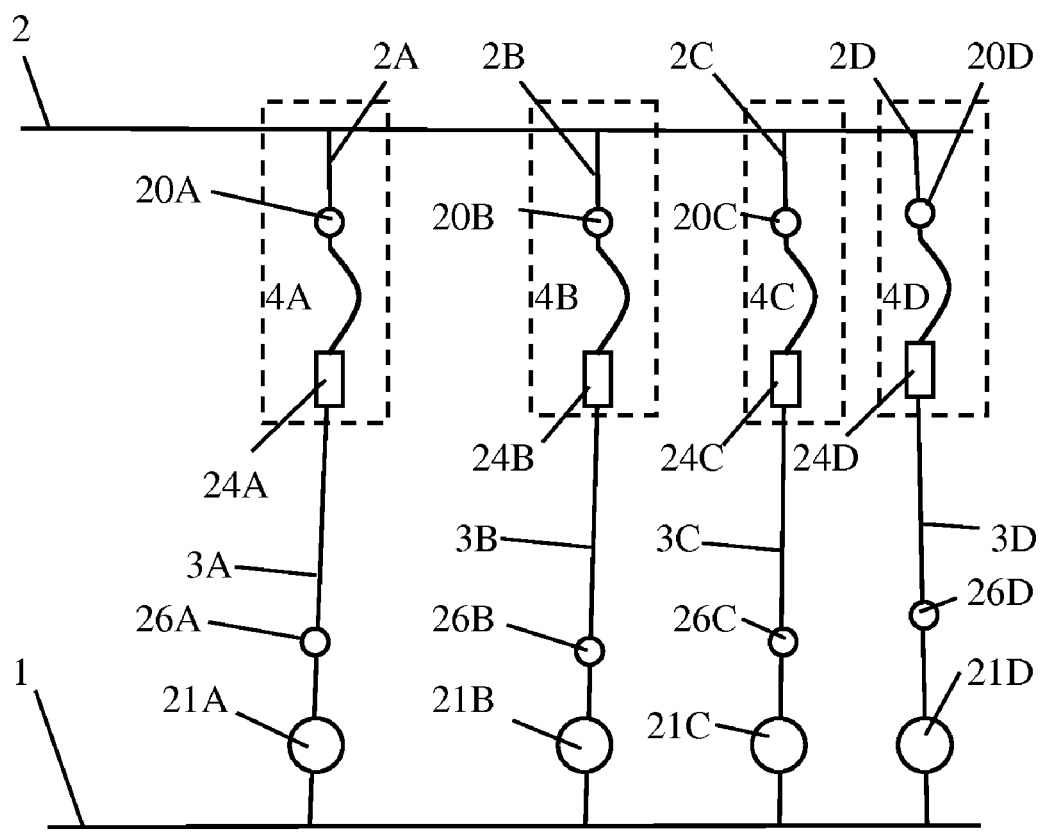
FIG. 2 illustrates parts of the arrangement of milking stations and cleaning line in accordance with FIG. 1 in greater detail.

FIG. 2 illustrates parts of the connections between the cleaning line 1 and the milking stations 4A-D at the milk line 2. The milking stations comprise milk conduits 2A-D connecting the teat cups 24A-D to the milk line. During milking the teat cups 24A-D are connected to the animals. During cleaning, illustrated in the figure, the teat cups 24A-D are connected to the branch conduits 3A-D of the cleaning line 1, each of the branch conduits being provided with flow regulating means 21A-D and flow sensors 26A-D.

Figure 3:
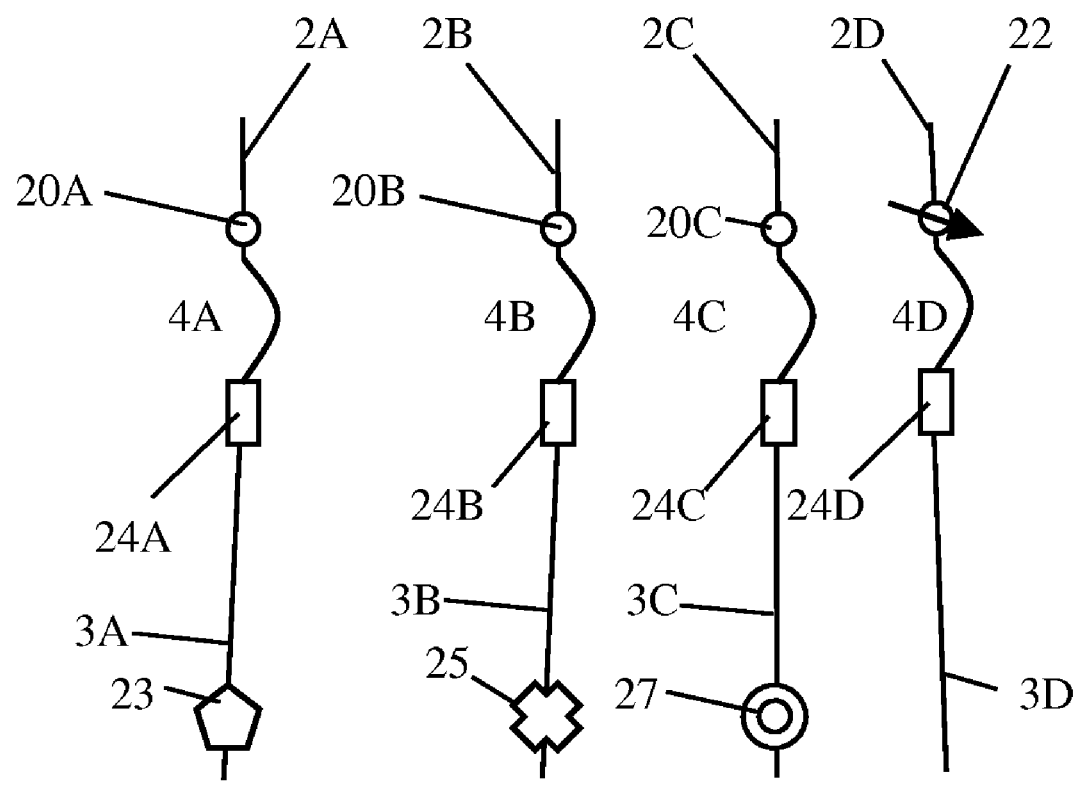
FIG. 3 illustrates symbolically embodiments of parts of the inventive arrangement of milking systems in accordance with FIGS. 1 and 2.

Examples on different regulating means are illustrated in FIG. 3, one at each milking station 4A-D. It is, however, preferred, to use the same type of regulating means for the supply of cleaning liquid at every milking station.

Only one teat cup is illustrated for each station, but the number should correspond to the number of teats of the animal. Different means and measures for flow regulation are illustrated in FIG. 3, such as adjusting a handle valve 25 manually, choosing and inserting a flow limiting insert 27 into the supply branch conduits 3, controlling an electronic valve 23 at the supply side, or electronically controlling valves in milk meters 22 that comprises such a controllable valve, at the milking station side. The regulating means is suitably chosen when choosing monitoring means. For example handle valves 25 are suitably used together with a display for an operator at the control unit, and the measured flows are displayed. Electronic valves 23 are suitably used together with a control unit monitoring the flow and being adapted to provide control signals as a response to the flows.

Milk meters 20A-D, 22 are, for example, used to measure the flow of cleaning liquid and the result is transferred to the milking control unit 18, comprising a display, where the result is displayed. Regulating can be performed manually by inserting flow limiting inserts 27, for example inserts shaped like washers with openings of a size chosen in dependence of the desired flow, into the supply conduit. Regulating by means of inserts can for instance be done during installation of new equipment. Alternatively, the supply conduits are provided with handle valves 25 and the regulation includes adjusting the handle valves 25 manually.

In another embodiment, milk meters 20A-D, 22 are used to measure the flow of cleaning liquid and transfer the result of the measuring to the milking control unit 18, which is adapted to, during cleaning, pass on the received result to the cleaning control unit 7 in the cleaning unit 5. The cleaning control unit 7 then regulates the supply of cleaning liquid by means of electronic valves 23 arranged in the supply conduits 3A-D.

In another embodiment, milk meters 22, comprising regulating valves 22, are used to measure the flow of cleaning liquid and transfer the result of the measuring to a milking control unit, which is adapted to provide control signals as a response. Thus the milk meters 22 are used both for measuring and regulating, and the control unit 7, 17, 18 use measurements from several milk meters to obtain an overall control and provide control signals or instructions for each individual milk meter valve.

In other embodiments, flow sensors 26 A-D are arranged in the supply conduits 3A-D and the measurements can be used by operators manually or by control units automatically in accordance with the invention.

The different types of regulating means 22, 23, 25, 27 can be combined so that, for example, during installation of the cleaning equipment the monitoring is used to choose suitable flow limiting inserts 27 so that the flows through the milking stations are balanced, i.e. becomes equally strong. During operation of the system the supply of cleaning liquid is then controlled by, for example, monitoring the supply by means of milk meters 22 transferring measurements to a control unit 18 and regulation the supply by automatically controlling electronic valves in the milk meters 22 by transferring control signals from the control unit 18 to the milk meters 22.

Also, the monitoring can track changes in the measurements between cleaning operations. The control unit can be adapted to alarm when deviations of the measurements increases and become larger than reference values since large deviations indicates changes in the system, possibly malfunctioning and the need for service in the system. Thus, the system is adapted to alarm when measured flows from successive cleaning operations differ more than a predefined threshold.

Preferred embodiments of a method and arrangement according to the invention have been described. A person skilled in the art realises that this could be varied within the scope of the appended claims.

The invention claimed is:

1. A method of monitoring the supply of re-circulating cleaning liquid to a milking system during a cleaning operation, comprising the steps of:
in a milking system comprising i) a milk line (2), ii) plural milking stations (4A-D), iii) plural milk conduits (2A-D), each milk conduit connecting the milk line to a respective one of the milking stations, iv) a cleaning line (1), vi) plural cleaning liquid supply conduits (3A-D), each supply conduit connectable to a respective one of the milk conduits at the milking stations and configured to re-circulate the cleaning liquid therethrough during the cleaning operation, vii) plural flow sensors, each flow sensor a) associated with a respective one of said milking stations and b) located in one of the milk conduit and the supply conduit of the associated milking station, viii) plural cleaning liquid regulating elements (21A-D, 23, 25, 27, 22) connected to the cleaning line, each of said regulating elements a) associated with a respective one of said milking stations, and b) located in one of the milk conduit and the supply conduit of the associated milking station, and ix) a control unit (7, 17, 18) operatively connected to each flow sensor, supplying the cleaning liquid through the supply conduits to the respective milk conduits of the respective milking stations so that the cleaning liquid flows through the respective milking stations;
using the flow sensors while re-circulating the cleaning liquid through the milk line and the cleaning liquid supply conduits during the cleaning operation, measuring a value of the flow of the cleaning liquid through each of the respective milking stations, and
having the flow sensors transfer said values of the measured flows to the control unit.

2. The method of claim 1, comprising the further step of, based on the transferring values of the measured flows, using the control unit to regulate cleaning liquid supplied through the supply conduit to the respective milk conduits of the respective milking stations so that the cleaning liquid flows through the respective milking stations in an apportioned manner while re-circulating the cleaning liquid during the cleaning operation.

3. The method of claim 2, wherein said regulating step comprising temporarily closing one of the regulating elements of one of the milking stations to increase the cleaning liquid flow through another milking station while re-circulating the cleaning liquid during the cleaning operation.

4. The method of claim 2, wherein said regulating step comprises reducing a difference between the values of the measured flows of the cleaning liquid through the respective milking stations while re-circulating the cleaning liquid during the cleaning operation.

5. The method of claim 1, wherein each flow sensor is a flow sensor in one of the supply conduits.

6. The method of claim 5, wherein each regulating element is one of i) an electronic valve located in one of the supply conduits, ii) a handle valve, iii) a flow limiting insert, and iv) an electronically controlling valve in one of the flow sensors.

7. The method of claim 1, wherein,
at least one flow sensor is a milk meter, and
and each regulating element is one of i) an electronic valve located in one of the supply conduits, ii) a handle valve, iii) a flow limiting insert, and iv) an electronically controlling valve in the at least one milk meter.

8. The method of claim 2, wherein,
one of said regulating elements is a handle valve, and
said regulating step comprises monitoring the value of the measured flow of one of the milking stations associated with the handle valve, as displayed on a display, and adjusting the handle valve in response to the monitored value.

9. The method of claim 1, wherein,
at least one flow sensor is a flow sensor in one of the supply conduits, and
at least one regulating element is an electronic valve.

10. The method of claim 1, wherein,
at least one flow sensor is a flow sensor in one of the supply conduits, and
at least one regulating element is a handle valve.

11. The method of claim 1, wherein,
at least one flow sensor is a flow sensor in one of the supply conduits, and
at least one regulating element is a flow limiting insert.

12. Arrangement for monitoring the supply of cleaning liquid to a milking system, comprising:
a milk line (2);
plural milking stations (4A-D);
plural milk conduits (2A-D), each milk conduit connecting the milk line to a respective one of the milking stations;
a cleaning line (1);
plural cleaning liquid supply conduits (3A-D) connected to the cleaning line, each supply conduit connectable to a respective one of the milk conduits at the milking stations and configured to re-circulate the cleaning liquid therethrough during the cleaning operation;
plural flow sensors, each flow sensor i) associated with a respective one of said milking stations and ii) located in one of the milk conduit and the supply conduit of the associated milking station;
plural cleaning liquid regulating elements (21A-D, 23, 25, 27, 22), each of said regulating elements i) associated with a respective one of said milking stations and ii) located in one of the milk conduit and the supply conduit of the associated milking station; and
a control unit (7, 17, 18) operatively connected to each flow sensor,
wherein the supply conduits are connectable to each of the respective milk conduits of the respective milking stations so that, in use, the cleaning liquid flows through the respective milking stations, and
wherein, in use while re-circulating the cleaning liquid through the milk line and the cleaning liquid supply conduits during the cleaning operation, the flow sensors measure a value of the flow of the cleaning liquid through each of the respective milking stations, and transfer said values of the measured flows to the control unit.

13. The arrangement of claim 12, wherein, based on the transferring values of the measured flows, in use while re-circulating the cleaning liquid during the cleaning operation, the control unit regulates cleaning liquid supplied through the supply conduit to the respective milk conduits of the respective milking stations so that the cleaning liquid flows through the respective milking stations in an apportioned manner.

14. The method of claim 12, wherein each flow sensor is a flow sensor in one of the supply conduits.

15. The arrangement of claim 12, wherein each regulating element is one of i) an electronic valve located in one of the supply conduits, ii) a handle valve, iii) a flow limiting insert, and iv) an electronically controlling valve in one of the flow sensors.

16. The arrangement of claim 12, wherein,
at least one flow sensor is a milk meter, and
and each regulating element is one of i) an electronic valve located in one of the supply conduits, ii) a handle valve, iii) a flow limiting insert, and iv) an electronically controlling valve in the at least one milk meter.

17. The arrangement of claim 12, further comprising:
a display connected to display the value of the measured flow of one of the milking stations, wherein,
the regulating element associated with the one milking station is a handle valve, and
the display is positioned to allow monitoring the value of the measured flow of the one milking station associated with the handle valve, as displayed on the display, to allow adjusting of the handle valve.

18. The arrangement of claim 12, wherein,
at least one flow sensor is a flow sensor in one of the supply conduits, and
at least one regulating element is an electronic valve.

19. The arrangement of claim 12, wherein,
at least one flow sensor is a flow sensor in one of the supply conduits, and
at least one regulating element is a handle valve.

20. The arrangement of claim 12, wherein,
at least one flow sensor is a flow sensor in one of the supply conduits, and
at least one regulating element is a flow limiting insert.

\* \* \* \* \*

UNITED STATES PATENT AND TRADEMARK OFFICE
CERTIFICATE OF CORRECTION

PATENT NO. : 8,381,680 B2
APPLICATION NO. : 12/602602
DATED : February 26, 2013
INVENTOR(S) : Westman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 647 days.

Signed and Sealed this
First Day of September, 2015

Michelle K. Lee
*Director of the United States Patent and Trademark Office*